United States Patent
Kusano et al.

(10) Patent No.: US 9,316,958 B2
(45) Date of Patent: Apr. 19, 2016

(54) CHARGE-CONTROLLED POLYURETHANE FOAM AND TONER-CONVEYING ROLLER USING THE SAME

(75) Inventors: Satoru Kusano, Yokohama (JP); Junichiro Sato, Yokohama (JP); Katsuya Seki, Yokohama (JP); Masaru Otsuka, Yokohama (JP); Youhei Takeda, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1220 days.

(21) Appl. No.: 13/003,238

(22) PCT Filed: Jul. 9, 2009

(86) PCT No.: PCT/JP2009/062547
§ 371 (c)(1),
(2), (4) Date: Apr. 1, 2011

(87) PCT Pub. No.: WO2010/005058
PCT Pub. Date: Jan. 14, 2010

(65) Prior Publication Data
US 2011/0177926 A1    Jul. 21, 2011

(30) Foreign Application Priority Data
Jul. 10, 2008    (JP) ................................. 2008-180461

(51) Int. Cl.
*G03G 15/16*    (2006.01)
*G03G 15/08*    (2006.01)
(Continued)

(52) U.S. Cl.
CPC ........ *G03G 15/1685* (2013.01); *G03G 15/0818* (2013.01); *B32B 1/08* (2013.01);
(Continued)

(58) Field of Classification Search
CPC .......... G03G 15/1685; G03G 15/0818; G03G 2215/1616
USPC ............. 428/306.6, 308.4, 317.9; 492/53, 56, 492/57, 59
See application file for complete search history.

(56) References Cited

U.S. PATENT DOCUMENTS 5,220,383 A *    6/1993    Enoki et al. .................... 399/285
6,177,223 B1 *    1/2001    Hashimoto et al. ......... 430/110.1
(Continued)

FOREIGN PATENT DOCUMENTS

JP    57-115433 A    7/1982
JP    3-087757 A    4/1991
(Continued)

OTHER PUBLICATIONS

English Translation of JP 11-84857 A to Hideki. Retrieved from Espace.net on May 8, 2014. In particular paragraph 30-34.*

Primary Examiner — Jason L Vaughan
(74) Attorney, Agent, or Firm — Sughrue Mion, PLLC

(57) ABSTRACT

Provided are charge-controlled polyurethane foam by which the influence of electrification by friction between toner on the surface layer of a toner-conveying roller and a developing roller can be sufficiently prevented and by which a good image can be stably obtained with a low cost, and a toner-conveying roller using the same.
The charge-controlled polyurethane foam is the one wherein the surface layer of the polyurethane foam is impregnated with a charge control agent which is on the negative side or on the positive side in the triboelectric series with respect to substrate polyurethane foam. The toner-conveying roller is the one which supports the charge-controlled polyurethane foam on the periphery of the axis of the roller.

7 Claims, 2 Drawing Sheets

(51) Int. Cl.
*B32B 1/08* (2006.01)
*B32B 5/18* (2006.01)
*B32B 15/04* (2006.01)

(52) U.S. Cl.
CPC ............... *B32B 5/18* (2013.01); *B32B 15/046* (2013.01); *B32B 2255/102* (2013.01); *B32B 2260/046* (2013.01); *B32B 2266/0278* (2013.01); *B32B 2307/202* (2013.01); *G03G 2215/1614* (2013.01); *Y10T 428/249953* (2015.04); *Y10T 428/249958* (2015.04)

(56) References Cited

U.S. PATENT DOCUMENTS

| | | | |
|---|---|---|---|
| 6,420,012 B1 * | 7/2002 | Takagi et al. | 428/141 |
| 7,505,720 B2 * | 3/2009 | Sugama et al. | 399/286 |
| 7,718,340 B2 * | 5/2010 | Iwamoto et al. | 430/123.5 |
| 7,816,063 B2 * | 10/2010 | Hashimoto et al. | 430/108.8 |
| 7,873,304 B2 * | 1/2011 | Iwamoto et al. | 399/252 |
| 7,960,083 B2 * | 6/2011 | Nakayama et al. | 430/124.1 |
| 8,010,022 B2 * | 8/2011 | Yamakawa | 399/279 |
| 8,376,922 B2 * | 2/2013 | Akama et al. | 492/56 |
| 8,503,916 B2 * | 8/2013 | Anan et al. | 399/286 |
| 2006/0130330 A1 * | 6/2006 | Kim | 29/895.21 |
| 2007/0107225 A1 * | 5/2007 | Kim | 29/895.2 |

FOREIGN PATENT DOCUMENTS

| | | |
|---|---|---|
| JP | 6-095424 A | 4/1994 |
| JP | 10-186836 A | 7/1998 |
| JP | 11-38749 A | 2/1999 |
| JP | 11-084857 A | 3/1999 |
| JP | 2002-319315 A | 10/2002 |
| JP | 2003-215905 A | 7/2003 |
| JP | 2008-116607 A | 5/2008 |
| WO | 2008/146925 A1 | 12/2008 |

* cited by examiner

CHARGE-CONTROLLED POLYURETHANE FOAM AND TONER-CONVEYING ROLLER USING THE SAME

CROSS REFERENCE TO RELATED APPLICATIONS

This application is a National Stage of International Application No. PCT/JP2009/062547, filed on Jul. 9, 2009, which claims priority from Japanese Patent Application No. 2008-180461, filed on Jul. 10, 2008, the contents of all of which are incorporated herein by reference in their entirety.

TECHNICAL FIELD

The present invention relates to charge-controlled polyurethane foam and a toner-conveying roller using the same (hereinafter, also simply referred to as "a roller"), and particularly, to charge-controlled polyurethane foam used for a toner-conveying roller which is used for providing with toner a developing roller which forms a visible image on the surface of an image forming body such as a photoconductor or a paper by conveying toner (developer) to the image forming body in an image forming apparatus such as a copier or a printer, and a toner-conveying roller using the same.

BACKGROUND ART

In general, in a developing unit of an electrophotography image forming apparatus or the like such as a copier or a printer, as shown in FIG. 3, an image forming body 11 such as a photoconductor retaining an electrostatic latent image, a developing roller 12 which makes the electrostatic latent image a visible image by making the image forming body 11 come in contact with the roller and attaching toner 20 which is supported on the surface of the roller to the image forming body 11, and a toner-conveying roller 13 (including a toner-providing roller and a cleaning roller for sweeping off unwanted toner) for providing the developing roller 12 with toner are provided, and an image formation is performed by a series of processes in which the toner 20 is conveyed from a toner storage unit 14, via the toner-conveying roller 13 and the developing roller 12, to the image forming body 11. In this figure, 15 represents a transfer roller, 16 a charge unit, 17 an exposure unit, and 18 a blade for sweeping off toner.

Among these, the toner-conveying roller 13 is formed in a structure that an electrically conductive elastic body such as polyurethane foam is supported on the periphery of the axis via an adhesion layer from a viewpoint that the toner-conveying roller 13 should not damage the developing roller 12 by coming in contact with the developing roller 12, and from a viewpoint that a grip performance is ensured by increasing contact area of the rollers or the like. Examples of functions required for the toner-conveying roller 13 include a toner conveying ability, a toner charging ability, and a toner sweeping ability. In order to satisfy these functions, various measures have been taken.

For example, by using a method in which electrically conductive treatment liquid such as electrically conductive carbon black or the like is impregnated in a polyurethane foam which constitutes the toner-conveying roller 13 (see, Patent Documents 1 to 3), or by using a method in which an electrically conductive carbon is kneaded, an electric resistance is reduced, a toner charge amount (Q/M) is decreased, and a toner conveying amount (M/A) is heightened, whereby a failure of an image blur during an endurance image evaluation has not been allowed to occur.

Without using an electrically conductive material such as carbon, by embossing the surface of the toner-conveying roller 13 to heighten physically the toner conveying amount (M/A), a failure such as an image blur during an endurance image evaluation has not been allowed to occur (see, Patent Document 4).

Further, it has been known that the toner conveying ability increases by exposing apart of fine particles for charging toner from an elastomeric foam layer (see Patent Document 5).

RELATED ART DOCUMENTS

Patent Documents

Patent Document 1: Japanese Unexamined Patent Application Publication No. S57-115433 (Claims and the like)
Patent Document 2: Japanese Unexamined Patent Application Publication No. 2002-319315 (Claims and the like)
Patent Document 3: Japanese Unexamined Patent Application Publication No. 2003-215905 (Claims and the like)
Patent Document 4: Japanese Unexamined Patent Application Publication No. H11-38749 (Claims and the like)
Patent Document 5: Japanese Unexamined Patent Application Publication No. 2008-116607 (Claims and the like)

SUMMARY OF THE INVENTION

Problems to be Solved by the Invention

However, in any of the methods described in Patent Documents 1 to 3, because the polyurethane foam is impregnated with an electrically conductive material, the influence of electrification by friction between toner on the surface layer of a toner-conveying roller and a developing roller cannot be sufficiently prevented, and thus, a sufficient toner conveying ability cannot be obtained, thereby to generate a failure such as an image blur during an endurance image evaluation.

In the method of kneading carbon in polyurethane foam, although there is no need to worry about an image failure due to the absence of carbon detachment, because carbon is dispersed and molding by a mold is forced to be performed in the polyurethane foam molding process, a small lot production in a batch manner is required, which leads to cost increases.

Further, in the method described in Patent Document 4, a toner-conveying roller having a high resistance is used without using carbon and a concavo-convex shape is required to be formed on the surface of the roller, and thus the roller is generally molded in a mold (cavity) whose inside has a concavo-convex shape. Therefore, there have been various cost increasing factors following the molding of the respective rollers such as a mold cost, a mold maintenance and a mold releasing property process inside the mold (mold release agent, fluorine coating).

Further, in the method described in Patent Document 5, in which a part of fine particles for charging toner is exposed by simple adhesion of the fine particles for charging toner on the surface of the roller, for example, by spraying an adhesive on the surface of the roller and then adhering fine particles for charging toner, there are problems in that the fine particles for charging toner damage the other members to generate a poor image, and in that an image density decreases due to a decrease in the charge amount during an endurance.

Accordingly, an object of the present invention is to solve the above-mentioned problems, and to provide charge-controlled polyurethane foam by which the influence of electrification by friction between toner on the surface layer of a toner-conveying roller and a developing roller can be sufficiently prevented and by which a good image can be stably obtained with a low cost, and a toner-conveying roller using the same.

Means for Solving the Problems

To solve the above-mentioned problems, the present inventors intensively studied to discover that the problems can be solved by employing charge-controlled polyurethane foam which is impregnated with a specified charge control agent in the surface layer, thereby completing the present invention.

That is, charge-controlled polyurethane foam of the present invention is characterized in that the surface layer of the polyurethane foam is impregnated with a charge control agent which is on the negative side or on the positive side in the triboelectric series with respect to the substrate polyurethane foam.

The charge-controlled polyurethane foam of the present invention is preferably polyurethane foam wherein said substrate polyurethane foam is substrate polyurethane foam impregnated with carbon conductive material or substrate polyurethane foam in which carbon conductive material is added inside.

A toner-conveying roller of the present invention is characterized by supporting the charge-controlled polyurethane foam on the periphery of the axis of the roller.

The toner-conveying roller of the present invention is preferably a roller wherein said charge control agent is on the negative side in the triboelectric series with respect to said substrate polyurethane foam, and wherein the roller is for positively charged toner; or is preferably a roller wherein said charge control agent is on the positive side in the triboelectric series with respect to said substrate polyurethane foam, and wherein the roller is for negatively charged toner.

Effects of the Invention

According to the present invention, by the above-mentioned constitution, it became possible to attain charge-controlled polyurethane foam by which the influence of electrification by friction between toner on the surface layer of a toner-conveying roller and a developing roller can be sufficiently prevented and by which a good image can be stably obtained with a low cost, and a toner-conveying roller using the same.

MODES FOR CARRYING OUT THE INVENTION

Figure 1:
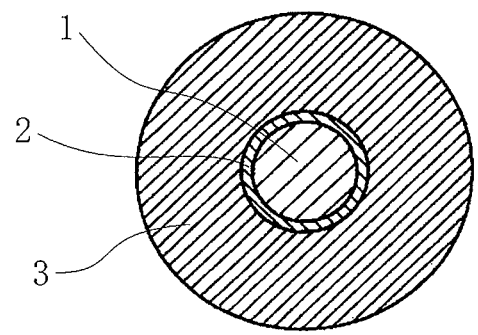
FIG. 1 is a cross-sectional view of the toner-conveying roller of one embodiment of the present invention in the width direction.

Preferred embodiments of the present invention will be described in detail with reference to the figures.

Charge-controlled polyurethane foam of the present invention is the one wherein the surface layer of the polyurethane foam is impregnated with a charge control agent which is on the negative side or on the positive side in the triboelectric series with respect to the substrate polyurethane foam. By this, the influence of electrification by friction between toner on the surface of a toner-conveying roller and a developing roller can be sufficiently prevented. Also, by impregnating with the charge control agent, detachment of the charge control agent is prevented, and therefore, the effect of providing charging ability can be stably generated, whereby a good image can be obtained with a low cost. As used herein, "surface layer" indicates a range where effects of the present invention can be sufficiently achieved even when a charge control agent is not impregnated on the whole of the substrate polyurethane foam and thus an amount of impregnated charge control agent is small.

In the present invention, the charge control agent is not restricted as long as the agent is on the negative side or on the positive side in the triboelectric series with respect to the substrate polyurethane foam, and is substance which is generally used as a charge control agent or electrification control agent for toner. Here, whether the charge control agent is located on the negative side in the triboelectric series or is located on the positive side in the triboelectric series can be concretely determined by the following method.
(Method for Determining the Location in the Triboelectric Series)

An object material to be measured is left to stand for 4 hours in an atmosphere at a temperature of 23° C., a relative humidity of 55%. A static electricity of the object material to be measured is removed by SJ-F300 Static eliminator (manufactured by KEYENCE CORPORATION). The object material to be measured is rubbed with polyurethane foam which is used as a substrate (polyurethane foam), and measured with Electrostatic Voltmeter (manufactured by TREK Japan KK "MODEL 347"). The locations in the triboelectric series are determined by whether the polyurethane foam and the object material to be measured are positively (plus) charged or negatively (minus) charged.

Specific examples of charge control agents which are on the negative side in the triboelectric series with respect to the substrate polyurethane foam which is used in the present invention (hereinafter, referred to as "negatively charged charge control agent") include (A) boron acid salt, (B) borate ester compound, (C) polyhydroxyalkanoate, (D) metal compound of salicylic acid derivatives, (E) metal compound of oxynaphthoic acid derivatives, (F) azo-based metal complex compound, (G) metal compound of aromatic oxycarboxylic acid, (H) copolymer in which monomers having a sulfonic acid group as copolymerization ingredients are polymerized, (I) copolymer in which monomers having a carboxyl group as copolymerization ingredients are polymerized, (J) organometallic compound in which zirconium or aluminum, zinc, and aromatic compound(s) selected from the group consisting of aromatic diol, aromatic hydroxy carboxylic acid, aromatic monocarboxylic acid and aromatic polycarboxylic acid are coordinated and/or bonded, (K) complex of boron or aluminum, and benzilic acid derivatives, (L) sulfur-containing resins. These negatively charged charge control agents can be used alone or two or more thereof can be used in combination. Depending on the kind of toner to be used and the amount of binder, polyvinyl chloride, polyvinyl alcohol and polyvinyl acetate resins used as the binder may sometimes have by itself an effect corresponding to the effect of a negatively charged charge control agent.

As the (A) boron acid salt, for example, sodium salt, potassium salt, ammonium salt or the like is preferred, and particularly potassium salt is more preferred although not restricted thereto.

As the (B) borate ester compound, those which are represented by the following general formula (1):

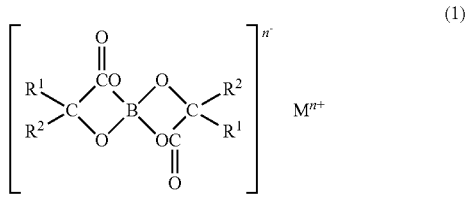

(in the general formula (1), $R^1$ and $R^2$ represent a hydrogen atom, alkyl group or aryl group, and may be the same or different; M represents alkali metal or alkaline earth metal; and n is an integer) can be preferably employed.

In the general formula (1), the alkyl group represented by $R^1$ and $R^2$ is not restricted, and preferably a C1-18 alkyl group, more preferably, a methyl group, ethyl group, propyl group, butyl group or pentyl group, and particularly preferably a butyl group or pentyl group.

In the general formula (1), examples of the aryl group represented by $R^1$ and $R^2$ include a phenyl group, tolyl group, xylyl group, biphenyl group, naphthyl group, anthryl group and phenanthryl group. Among these, a phenyl group is preferred.

Further, in the general formula (1), examples of the alkali metal or alkaline earth metal represented by M include lithium, potassium, calcium and sodium. Lithium and potassium are particularly preferred.

As the (C) polyhydroxyalkanoate, those which are represented by the following general formula (2):

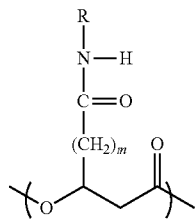

(in the general formula (2), R represents $-A^1-(SO_2R^3)x$; $R^3$ represents OH, halogen atom, ONa, OK or $OR^{3a}$; $R^{3a}$ and $A^1$ represent a substituted or unsubstituted aliphatic hydrocarbon group, substituted or unsubstituted aromatic group, or substituted or unsubstituted heterocyclic group; m and x are integers selected from 1 to 8; if a plurality of units exist, R, $R^3$, $R^{3a}$, $A^1$, m and x represent independently the above meanings for each unit) are preferably employed.

As the (D) metal compound of salicylic acid derivatives, a metal compound of dialkylsalicylic acid is preferred, and particularly, a metal compound of di-tert-butylsalicylic acid is preferred. As the metal element, aluminium, gallium, magnesium, calcium, titanium, chromium, zinc, zirconium, hafnium or the like is preferred, and particularly, aluminium compound is preferred.

Examples of the (E) metal compound of oxynaphthoic acid derivatives include organometallic compounds composed of oxynaphthoic acid derivatives represented by the following general formula (3):

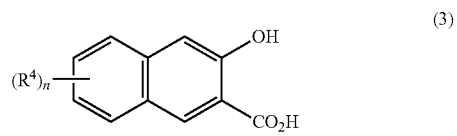

(in the general formula (3), $R^4$ represents a hydrogen atom, linear or branched alkyl group, alkoxy group, nitro group, amino group, carboxyl group, aralkyl group, phenyl group, benzyl group or halogen atom; and n represents an integer of 0 to 4), and a metal such as aluminium, chromium, cobalt, iron, titanium or zinc.

As the azo metal complex compound, those which are represented by the following general formula (4):

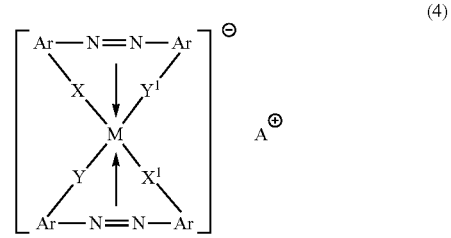

(in the general formula (4), M represents a coordination center metal (chromium, cobalt, nickel, manganese, iron, titanium, aluminium or the like); Ar represents an aryl group which may have a variety of substituents; X, $X^1$, Y and $Y^1$ each represent O, CO, NH or $NR^5$ ($R^5$ is a C1-4 alkylene group); and $A^+$ represents a hydrogen ion, sodium ion, potassium ion, ammonium ion or aliphatic ammonium ion, and these ions may be mixed) are preferably employed.

Examples of the (G) aromatic oxycarboxylic acid which constitutes the metal compound of aromatic oxycarboxylic acid include salicylic acid, m-oxybenzoic acid, p-oxycarboxylic acid, gallic acid, mandelic acid and tropic acid. Among these, bivalent or more aromatic carboxylic acids are preferably employed, and particularly, isophthalic acid, terephthalic acid, trimellitic acid or naphthalene dicarboxylic acid is preferred. As metals which form a metal compound with these aromatic carboxylic acids, bivalent or more metal is preferred, and specific examples of the metals include magnesium, calcium, strontium, lead, iron, cobalt, nickel, zinc, copper, zirconium, hafnium, aluminium and chromium.

With respect to the (H) copolymer in which monomers having a sulfonic acid group as copolymerization ingredients are polymerized, as the monomers having a sulfonic acid group, sulfonic acid containing acrylamide monomer is preferred, and examples of the monomers having a sulfonic acid group include 2-acrylamidepropanesulfonic acid, 2-acrylamide-n-butanesulfonic acid, 2-acrylamide-n-hexanesulfonic acid, 2-acrylamide-n-octanesulfonic acid, 2-acrylamide-n-dodecanesulfonic acid, 2-acrylamide-n-tetradecanesulfonic acid, 2-acrylamide-2-methylpropanesulfonic acid, 2-acrylamide-2-phenylpropanesulfonic acid, 2-acrylamide-2,2,4-trimethylpentanesulfonic acid, 2-acrylamide-2-methylphenylethanesulfonic acid, 2-acrylamide-2-(4-chlorophenyl)propanesulfonic acid, 2-acrylamide-2-carboxymethylpropanesulfonic acid, 2-acrylamide-2-(2-pyridyl)propanesulfonic acid, 2-acrylamide-1-methylpropanesulfonic acid, 3-acrylamide-3-methylbutanesulfonic acid, 2-methacrylamide-n-decanesulfonic acid and 2-methacrylamide-n-tetradecanesulfonic acid. Among these, 2-acrylamide-2-methylpropanesulfonic acid is preferably exemplified.

Examples of the copolymerization ingredients include vinyl monomers such as styrene monomers, olefin monomers, diene monomers, halogenated vinyls, vinyl esters and (meth)acrylic acid.

As the (I) copolymer in which monomers having a carboxyl group as copolymerization ingredients are polymerized, as the monomers having a carboxyl group, those which are represented by the following general formula (5):

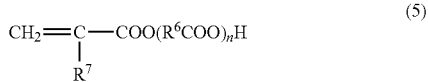

(in the general formula (5), $R^6$ represents C2-6 alkylene group; $R^7$ represents a hydrogen atom or methyl group; and n represents an integer of 0 to 10), or those which are represented by the following general formula (6):

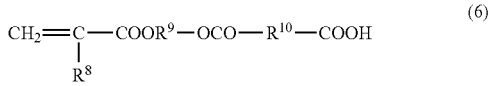

(in the general formula (6), $R^8$ represents a hydrogen atom or methyl group; $R^9$ represents a C2-4 alkylene group; $R^{10}$ represents an ethylene group, vinylene group, 1,2-cyclohexylene group or 1,2-phenylene group) are preferably employed.

As the monomers having a carboxyl group represented by the general formula (5), for example, (meth)acrylic acid, (meth)acrylic acid dimer, ω-carboxy-polycaprolactone mono (meth)acrylate and the like are exemplified.

As the monomers having a carboxyl group represented by the general formula (6), for example, succinic acid monohydroxyethyl(meth)acrylate, maleic acid monohydroxyethyl(meth)acrylate, fumaric acid monohydroxyethyl(meth)acrylate, phthalic acid monohydroxyethyl(meth)acrylate, 1,2-dicarboxycyclohexane monohydroxyethyl(meth)acrylate and the like are exemplified.

Further, similarly to the (H) copolymer, examples of the copolymerization ingredients include vinyl monomers such as styrene monomers, olefin monomers, diene monomers, halogenated vinyls, vinyl esters and (meth)acrylic acid.

The (J) organometallic compound in which zirconium or aluminium, zinc, and aromatic compound(s) selected from the group consisting of aromatic diol, aromatic hydroxy carboxylic acid, aromatic monocarboxylic acid and aromatic polycarboxylic acid are coordinated and/or bonded is defined as those in which an aromatic compound as a ligand coordinates to zirconium or aluminium and zinc to form a metal complex or a metal complex salt.

As the (K) complex of boron or aluminum, and benzilic acid derivatives, those which are represented by the following general formula (7):

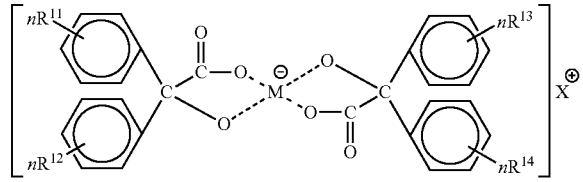

(in the general formula (7), M is boron or aluminium; X is lithium, sodium or potassium; $R^{11}$, $R^{12}$, $R^{13}$ and $R^{14}$ are each independently represent a hydrogen atom, C1-4 alkyl group, C1-4 alkoxy group or halogen atom; a plurality of $R^{11}$, $R^{12}$, $R^{13}$ and $R^{14}$ may exist, and if a plurality of $R^{11}$, $R^{12}$, $R^{13}$ and $R^{14}$ exist, each of these may be different or the same; and n represents an integer of 1 to 5) can be preferably employed.

As the (L) sulfur resins, a polymer or copolymer which has a sulfonic acid group is preferred, and a polymer or copolymer containing sulfur which has a sulfonic acid group-containing acrylamide monomer as a constituent is particularly preferred.

Examples of sulfonic acid group-containing acrylamide monomers include 2-acrylamidepropanesulfonic acid, 2-acrylamide-n-butanesulfonic acid, 2-acrylamide-n-hexanesulfonic acid, 2-acrylamide-n-octanesulfonic acid, 2-acrylamide-n-dodecanesulfonic acid, 2-acrylamide-n-tetradecanesulfonic acid, 2-acrylamide-2-methylpropanesulfonic acid, 2-acrylamide-2-phenylpropanesulfonic acid, 2-acrylamide-2,2,4-trimethylpentanesulfonic acid, 2-acrylamide-2-methylphenylethanesulfonic acid, 2-acrylamide-2-(4-chlorophenyl)propanesulfonic acid, 2-acrylamide-2-carboxymethylpropanesulfonic acid, 2-acrylamide-2-(2-pyridyl)propanesulfonic acid, 2-acrylamide-1-methylpropanesulfonic acid, 3-acrylamide-3-methylbutanesulfonic acid, 2-methacrylamide-n-decanesulfonic acid, 2-methacrylamide-n-tetradecanesulfonic acid. Among these, 2-acrylamide-2-methylpropanesulfonic acid is particularly preferred.

As the copolymerization ingredient with the sulfonic acid group-containing acrylamide monomer, styrene monomers and acrylic monomers are preferred, and a combination of styrene and acrylic acid ester or a combination of styrene and methacrylic acid ester is preferably exemplified.

Specific examples of charge control agents which are on the positive side in the triboelectric series with respect to the substrate polyurethane foam which is used in the present invention (hereinafter, referred to as "positively charged charge control agent") include (a) copolymer in which (meth)acrylate monomer is polymerized as a copolymerization ingredient, (b) copolymer in which amino group-containing monomer is polymerized as a copolymerization ingredient, (c) hydroxyl group-containing amino compound, (d) polymer having imidazolium salts as a constituent unit, (e) quaternary ammonium salt compound, (f) nigrosine-based compound, and (g) triphenylmethane-based compound. These positively charged charge control agents can be used alone or two or more thereof can be used in combination. Depending on the kind of toner to be used and the amount of binder, polyacrylamide, butadiene resin, epoxy resin, alkyd resin, melamine resin and chloroprene rubber used as the binder may sometimes have by itself an effect corresponding to the effect of a positively charged charge control agent.

As the (a) copolymer in which (meth)acrylate monomer is polymerized as a copolymerization ingredient, those which have as a main ingredient a (meth)acrylate represented by the following general formula (8):

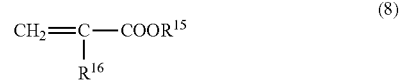

(in the general formula (8), $R^{15}$ represents an alkyl group having 4 or more carbon atoms; $R^{16}$ represents a hydrogen atom or methyl group; $R^{15}$ is preferably an alkyl group having 6 or more carbon atoms, more preferably an alkyl group having 8 or more carbon atoms, and further, $R^{15}$ is preferably an alkyl group having 20 or less carbon atoms; and $R^{15}$ may be linear or branched and may have a cyclic structure) can be preferably employed.

Specifically, n-butyl(meth)acrylate, tert-butyl(meth)acrylate, iso-butyl(meth)acrylate, n-amyl (meth)acrylate, n-hexyl (meth)acrylate, cyclohexyl(meth)acrylate, 2-ethylhexyl (meth)acrylate, n-octyl(meth)acrylate, iso-octyl(meth) acrylate, n-nonyl(meth)acrylate, n-lauryl(meth)acrylate, n-tridecyl(meth)acrylate, n-stearyl(meth)acrylate, isobornyl (meth)acrylate and the like are exemplified. Note that "(meth) acrylate" means methacrylate or acrylate.

The copolymerization ingredient is not particularly restricted, and examples thereof include vinyl monomers such as (meth)acrylate monomers having a C1-3 alkyl group, styrene monomers, olefin monomers, diene monomers, halogenated vinyls, vinyl esters and (meth)acrylic acid. A copolymer using the after-mentioned (b) amino group-containing monomer is also a preferred mode.

As the (b) copolymer in which amino group-containing monomer is polymerized as a copolymerization ingredient, those which have as a main ingredient an amino group-containing monomer represented by the following general formula (9):

(9)

(in the formula (9), $R^{17}$ represents a hydrogen atom or methyl group; $R^{18}$ represents a bivalent C1-7 organic group; each of $R^{19}$ and $R^{20}$ independently is preferably a hydrogen atom or C1-20 organic group, and particularly a C2-4 organic group; or $R^{19}$ and $R^{20}$ may be chemically bonded and may have a C4-20 cyclic structure; or $R^{19}$ and $R^{20}$ are chemically bonded and may have a C4-19 cyclic structure which has at least one selected from a nitrogen atom, oxygen atom, sulfur atom) can be preferably employed.

Specifically, N,N-dimethylaminoethyl(meth)acrylamide, N,N-diethylaminoethyl(meth)acrylamide, N,N-dimethylaminopropyl(meth)acrylamide, N,N-diethylaminopropyl (meth)acrylamide, p-N,N-dimethylaminophenyl(meth)acrylamide, p-N,N-diethylaminophenyl(meth)acrylamide, p-N,N-dipropylaminophenyl(meth)acrylamide, p-N,N-dibutylaminophenyl(meth)acrylamide, p-N-laurylaminophenyl(meth)acrylamide, p-N-stearylaminophenyl(meth)acrylamide, p-N,N-dimethylaminobenzyl(meth)acrylamide, p-N,N-diethylaminobenzyl(meth)acrylamide, p-N,N-dipropylaminobenzyl(meth)acrylamide, p-N,N-dibutylaminobenzyl(meth)acrylamide, p-N-laurylaminobenzyl(meth)acrylamide, p-N-stearylaminobenzyl(meth)acrylamide and the like are exemplified. The amino group-containing monomers represented by the general formula (9) can be used alone or two or more thereof can be used in combination. Note that "(meth) acrylamide" means methacrylamide or acrylamide.

As the copolymerization ingredients, the (a) ingredient is preferred. Further, vinyl monomers such as (meth)acrylate monomers having a C1-3 alkyl group, styrene monomers, olefin monomers, diene monomers, halogenated vinyls, vinyl esters and (meth)acrylic acid are exemplified.

As the (c) hydroxyl group-containing amino compound, those which are represented by the following general formula (10):

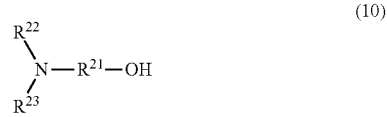

(10)

or the following general formula (11):

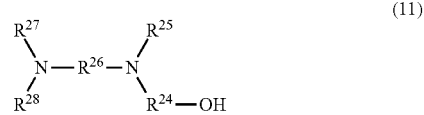

(11)

(in the general formulae (10) and (11), $R^{21}$, $R^{24}$ and $R^{26}$ are a C1-8 alkylene group or an ethyleneoxide group which recurs 1 to 4 times; $R^{22}$, $R^{23}$, $R^{25}$, $R^{27}$, $R^{28}$ are each a C1-8 alkyl group; and $R^{22}$ and $R^{23}$, $R^{24}$ to $R^{28}$ may be the same or different) can be preferably employed.

Specific examples of the hydroxyl group-containing amino compounds represented by the general formulae (10) and (11) include dimethylethanolamine, and as commercially available products "KAOLIZER No. 25 (trade name)" manufactured by Kao Corporation and "POLYCAT 17 (trade name)" manufactured by Sankyo Air Products Co., Ltd.

As the (d) polymer having imidazolium salts as a constituent unit, those which have as a main ingredient an imidazolium salt represented by the following general formula (12):

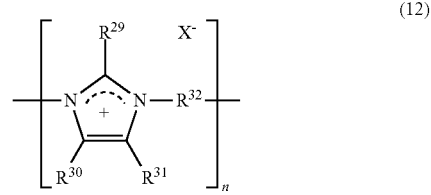

(12)

(in the general formula (12), $R^{29}$ represents a hydrogen atom or C1-17 hydrocarbon group; each of $R^{30}$ and $R^{31}$ is independently a hydrogen atom or C1-8 hydrocarbon group; or $R^{30}$ and $R^{31}$ may be connected to form a cyclic structure; $R^{32}$ represents a C1-12 alkylene group which may contain an ether bond; $X^-$ represents an anion; and n represents an integer of 2 to 100) can be preferably employed.

In the general formula (12), examples of the C1-17 hydrocarbon group in $R^{29}$ include alkyl groups such as a methyl group, ethyl group, undecyl group, tridecyl group, pentadecyl group and heptadecyl group; alkenyl groups such as an undecenyl group, tridecenyl group and heptadecenyl group; alkylphenyl groups such as a pentylphenyl group and hexylphenyl group; aryl groups such as a phenyl group; and aralkyl groups such as a benzyl group. Among these, a hydrogen atom and C11-17 alkyl group are preferred, and in particular, an undecyl group, tridecyl group, pentadecyl group and heptadecyl group are preferred.

In the general formula (12), examples of the C1-8 hydrocarbon group in $R^{30}$ and $R^{31}$ include alkyl groups such as a methyl group, ethyl group, propyl group, butyl group, hexyl group and octyl group; aryl groups such as a phenyl group; and aralkyl groups such as a benzyl group. As the cyclic structure in which $R^{30}$ and $R^{31}$ are mutually connected, a benzo group is exemplified. Among these, a hydrogen atom, methyl group, ethyl group and benzo group are preferred, and in particular, a hydrogen atom and benzo group are preferred.

In the general formula (12), specific examples of $R^{32}$ include a methylene group, ethylene group, trimethylene group, tetramethylene group, hexamethylene group, octanemethylene group, decamethylene group, dodecamethylene group, and groups such as —$CH_2CH_2OCH_2CH_2$—, —$CH_2CH_2OCH_2OCH_2CH_2$— and —$CH_2CH_2OCH_2CH_2OCH_2CH_2$—. Among these, ethylene group, trimethylene group, tetramethylene group, hexamethylene group, —$CH_2CH_2OCH_2CH_2$—, and —$CH_2CH_2OCH_2OCH_2CH_2$— are preferred, and in particular, trimethylene group, tetramethylene group, hexamethylene group and —$CH_2CH_2OCH_2CH_2$— are preferred.

In the general formula (12), examples of $X^-$ anion include halogen ion, sulfate ion, nitrate ion, phosphate ion, sulfonic acid ions (e.g., p-toluene sulfonic acid ion, methylsulfonic acid ion, hydroxynaphtosulfonic acid ion), carboxylic acid ion (e.g., formic acid ion, acetic acid ion, propionic acid ion, benzoic acid ion), boric acid ion (e.g., boric acid ion, metaboric acid ion, tetrafluoroboric acid ion, tetraphenylboric acid ion) and metal oxo-acid ion (e.g., molybdic acid ion, tungstic acid ion). Preferred among these are carboxylic acid ion, sulfonic acid ion, boric acid ion and oxo-acid ion.

As the (e) quaternary ammonium salt compound, those which are represented by the following general formula (13):

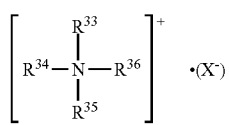

(in the general formula (13), each of $R^{33}$, $R^{34}$, $R^{35}$ and $R^{36}$ independently represents an alkyl group which may have a substituent, cycloalkyl group which may have a substituent, aralkyl group which may have a substituent, aryl group which may have a substituent; and $X^-$ represents an anion) can be preferably employed.

In the general formula (13), specific examples of the alkyl group in $R^{33}$, $R^{34}$, $R^{35}$ and $R^{36}$ include linear or branched C1-8 alkyl groups such as a methyl group and ethyl group, and examples of the substituent include C1-3 alkoxy groups such as a methoxy group and ethoxy group, halogen, a nitro group and a phenyl group.

In the general formula (13), specific examples of the cycloalkyl group in $R^{33}$, $R^{34}$, $R^{35}$ and $R^{36}$ include C3-8 cycloalkyl groups such as cyclopropyl group, cyclopentyl group, cyclohexyl group and cycloheptyl group, and examples of the substituent include the same groups as those mentioned in the above description about the alkyl groups.

In the general formula (13), specific examples of the aralkyl group in $R^{33}$, $R^{34}$, $R^{35}$ and $R^{36}$ include a benzyl group, α,α-dimethylbenzyl group, toluoyl group and phenethyl group, and examples of the substituent include the same groups as those mentioned in the above description about the alkyl groups.

In the general formula (13), specific examples of the aryl group in $R^{33}$, $R^{34}$, $R^{35}$ and $R^{36}$ include a phenyl group and naphthyl group, and examples of the substituent include the same groups as those mentioned in the above description about the alkyl groups.

In the general formula (13), as the anion represented by $X^-$, an organic or inorganic anion is exemplified, and specific examples of the anion include a naphthol sulfonic acid anion, an anion of toluene sulfonic acid and a halogen ion.

As the (f) nigrosine-based compound, compounds well-known for nigrosine-based dye can be employed, and, for example, "NIGROSINE BASE EX (trade name)", "OIL BLACK BS (trade name)", "OIL BLACK SO (trade name)", "BONTRON N-01 (trade name)", "BONTRON N-07 (trade name)", "BONTRON N-09 (trade name)" and "BONTRON N-11 (trade name)" (manufactured by Orient Chemical Industries Co., Ltd.) are commercially available.

As the (g) triphenylmethane-based compound, for example, those represented by the following general formula (14):

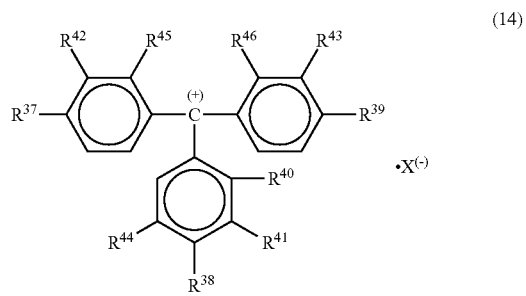

(in the general formula (14), each of $R^{37}$ and $R^{39}$ is independently a group selected from an amino group, mono- or di-alkylamino group having a C1-4 alkyl group, mono- or di-ω-hydroxyalkylamino group having a C2-4 alkyl group, unsubstituted or N-alkyl-substituted phenylamino group; $R^{38}$ is a hydrogen atom or a group which has been mentioned in $R^{37}$ and $R^{39}$; each of $R^{40}$ and $R^{41}$ is independently a hydrogen atom, halogen atom, sulfonic acid group, or both $R^{40}$ and $R^{41}$ are condensed to form a phenyl ring; each of $R^{42}$, $R^{43}$, $R^{45}$ and $R^{46}$ is independently a hydrogen atom, methyl group or ethyl group; $R^{44}$ is a hydrogen atom or halogen atom; and $X^-$ is a halogen ion, sulfate, molybdate, phosphomolybdate or boron anion, and among these, preferred are compounds in which $R^{37}$ and $R^{39}$ are a phenylamino group; $R^{38}$ is a m-methylphenylamino group; and $R^{40}$ to $R^{46}$ are a hydrogen atom) can be preferably employed.

In the present invention, a method of impregnation is not restricted as long as it is a method in which the surface layer can be impregnated with the above-mentioned charge control agent, and is preferably a method of impregnation with a solution.

In the present invention, substrate polyurethane foam can be provided with a charging ability according to a conventional method by being impregnated with the above-mentioned charge control agent, and particularly preferably, substrate polyurethane foam is provided with a charging ability by being impregnated with an impregnating solution which contains the above-mentioned charge control agent and binders.

It is preferable that the surface layer is locally impregnated with the charge control agent. Since charge control agents are insulative, such addition of a charge control agent increases the value of resistance of the roller. Thus, when a charge control agent is dispersed on the whole of the polyurethane foam, the value of resistance of the whole roller increases and it is difficult to control the value of the resistance of the roller in the range $10^2$ to $10^4 \Omega$ which is the target range. In order to prevent the increase of the value of resistance, carbon conducting agent should be added to the polyurethane foam excessively. In this case, when the amount of carbon added increases, the hardness of the roller increases, as well as the amount of carbon which can be detached from the polyurethane foam when the polyurethane foam is in contact with a developing roller during a long-term usage becomes significant, and a poor image generation is caused, which is problematic and not preferred. Therefore, from the viewpoint of attaining the above-mentioned value of resistance of the roller and a stable image property during a long-term usage, it is preferred that a charge control agent is locally disposed on the surface layer of the polyurethane foam.

In the present invention, the below-described electrically conductive material may be added to the impregnating solution. As the electrically conductive material, carbonaceous particles such as carbon black and graphite; powder of metal such as silver and nickel; electrically conductive metal oxide by itself such as tin oxide, titanium oxide or zinc oxide; or those which have an insulating particle made of, for example, barium sulfate as a core body covered with the above-mentioned electrically conductive metal oxide by using a wet process; electrically conductive metal carbide, electrically conductive metal nitride, electrically conductive metal boride or the like is employed alone, or two or more of those are employed in combination. From the viewpoint of cost, carbon black is preferred, and on the other hand, from the viewpoint of controllability of electrical conductivity, electrically conductive metal oxide is preferred.

As the above-mentioned binders, acrylic resins such as acrylate resins, polyacrylate resins, acrylate-styrene copolymer resins, acrylate-vinyl acetate copolymer resins; polyvinyl alcohols, polyacrylamides, polyvinyl chloride resins, urethane resins, vinyl acetate resins, butadiene resins, epoxy resins, alkyd resins, melamine resins, and chloroprene rubbers or the like may be exemplified. Particularly preferred are acrylate resins, urethane resins and chloroprene rubbers such as trade name: SE BINDER manufactured by ENEX CO., LTD., and trade name: TOCRYL BC-X6131, TOCRYL 5744 and TOCRYL X4402 manufactured by TOYO INK MFG. CO., LTD. These binders may be used alone or in combination as a mixture of two or more thereof. Although the charge control agent by itself cannot bind rigidly to the cell wall of polyurethane foam, the charge control agent adheres rigidly to the cell wall of polyurethane foam by adding the binder to form as the surface layer a stable charge control agent layer in cells of the polyurethane foam.

In the present invention, the compounding ratio of the charge control agent and the binder is preferably 10 to 110 parts by mass, particularly 30 to 50 parts by mass of solid content of the charge control agent with respect to 100 parts by mass of solid content of the binder. If the charge control agent is larger than 110 parts by mass, adhesion to polyurethane foam tends to be insufficient. On the other hand, if the charge control agent is smaller than 10 parts by mass, the surface resistance of the toner-providing roller tends to be unstable.

To the impregnating solution which contains the charge control agent and the binder, a proper amount of water and an organic solvent such as toluene or ethyl acetate may be added. Such solvents are preferably added such that a viscosity of the impregnating solvent is about 5 to 300 cps (25° C.). Setting the viscosity in this range makes an adhesion operation by impregnation more readily.

In the present invention, to the impregnating solution, other additives than those mentioned above, such as mineral oil-based antifoaming agents, silicone-based antifoaming agents, surfactants and charge control agents may be added as required. Such additives are preferably added at an amount of about 0.001 to 10 parts by mass, particularly at an amount of 0.001 to 0.1 part by mass with respect to 100 parts by mass of the impregnating solution.

Examples of the mineral oil-based antifoaming agents include self-emulsifying type silicone-based antifoaming agents under the trade names of: KS-508 and KS-537, oil type silicone-based antifoaming agent under the trade name of: KF-96, and oil compound type silicone-based antifoaming agent under the trade name of: KF-66 manufactured by Shin-Etsu Chemical Co., Ltd.

A toner-conveying roller of the present invention supports the above-mentioned charge-controlled polyurethane foam on the periphery of the axis of the roller, and is suitably applied to an image forming apparatus. FIG. 1 is a cross-sectional view of the toner-conveying roller of a preferred embodiment of the present invention in the width direction. The toner-conveying roller of the present invention shown in the figure supports charge-controlled polyurethane foam 3 on the periphery of an axis 1 of the roller via an adhesion layer 2. By this, the influence of electrification by friction between toner on the surface layer of a toner-conveying roller and a developing roller can be sufficiently prevented and a good image can be obtained with a low cost.

The toner-conveying roller of the present invention is preferably a roller wherein the charge control agent is on the negative side in the triboelectric series with respect to the polyurethane foam, and wherein the roller is for positively charged toner; or is preferably a roller wherein the charge control agent is on the positive side in the triboelectric series with respect to polyurethane foam, and wherein the roller is for negatively charged toner.

Figure 2:
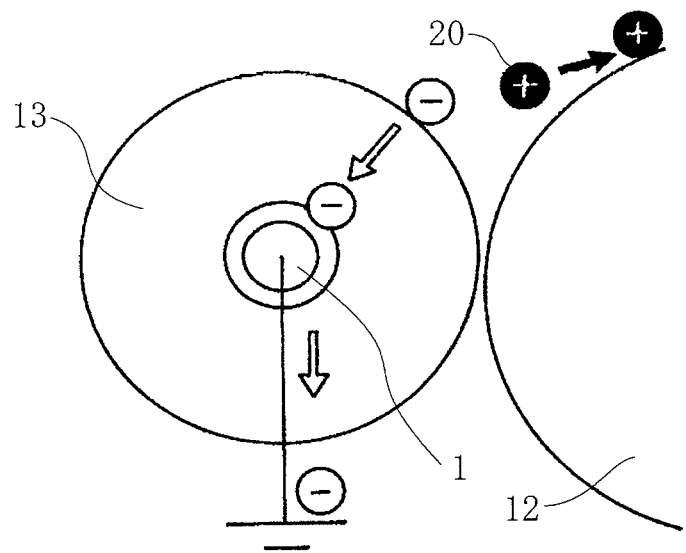
FIG. 2 is an illustrative view which illustrates a mechanism in which toner is conveyed from a toner-conveying roller to a developing roller.
Figure 3:
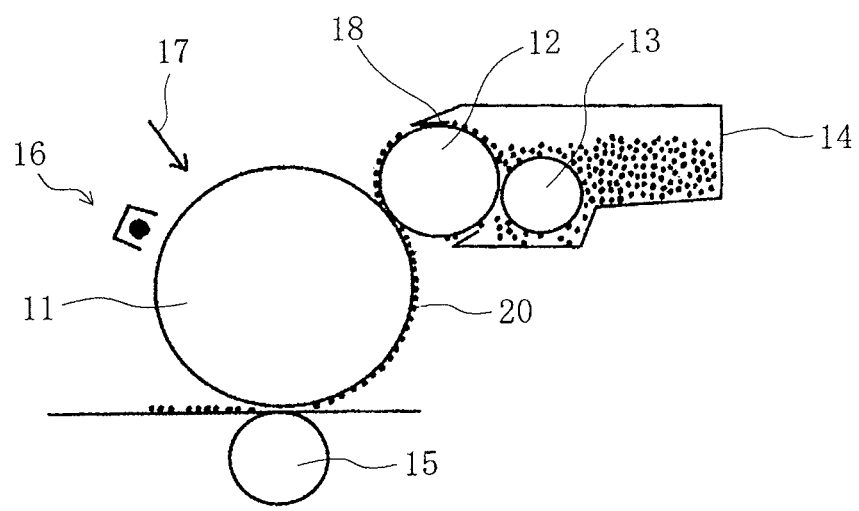
FIG. 3 is an illustrative schematic view of one example of an image forming apparatus.

The mechanism by which toner 20 is conveyed from a toner-conveying roller 13 to a developing roller 12 is as shown in FIG. 2. Firstly, to the positively (or negatively) charged toner 20, the surface layer of the toner-conveying roller 13 is negatively (or positively) charged by friction between the toner 20 and the developing roller 12. In the charged toner-conveying roller 13, by releasing charge via an axis 1 comprised of a cored bar or the like, the charge amount (the amount of electric charge) of the surface layer of the toner-conveying roller 13 is controlled. In this case, the less the charge amount of the surface layer of the toner-conveying roller 13 is, the harder the toner 20 is to be absorbed to the surface layer of the toner-conveying roller 13, and as a result, the amount of toner to be conveyed can be increased.

Further, an impregnation amount of the charge control agent (negatively charged charge control agent or positively charged charge control agent) in the charge-controlled polyurethane foam of the toner-conveying roller is preferably in the range of 0.1 to 50 parts by mass with respect to 100 parts by mass of the polyurethane foam. If the impregnation amount of the charge control agent is not smaller than 0.1 part by mass, the effect of the charge control agent can be further obtained. On the other hand, if the impregnation amount of the charge control agent is not larger than 50 parts by mass, the effect of preventing detachment of the charge control agent from the polyurethane foam can be obtained. The content of charge control agent is further preferably 1 to 5 parts by mass with respect to 100 parts by mass of the polyurethane foam. By this, the above-mentioned effect can be further obtained.

A roller of the present invention is not particularly restricted except that the surface layer of the substrate polyurethane foam is impregnated with charge control agent which is on the negative side or on the positive side in the triboelectric series with respect to the substrate polyurethane foam. A detail structure of the roller, materials of the roller, or the like can be appropriately determined as required.

In the present invention, polyurethane foam which is used as a substrate can be manufactured by a method described in Japanese Patent No. 3480028, in which method a compound which has two or more active hydrogens and a compound which has two or more isocyanate groups are stirred and mixed with additives such as catalysts, foaming agents and foam stabilizers to be foamed and hardened, or can be manufactured by a method using water as a foaming agent, in which method, for example, foam forming materials including a prepolymer made by reacting an isocyanate ingredient and a polyol ingredient in advance, water-dispersed carbon, a catalyst for the urethane reaction and the like are foamed in a prescribed form and thereafter heated to be hardened, a prepolymer method, a one-shot method, a partial prepolymer method or the like. For example, the polyurethane foam can be manufactured by mixing a polyether polyol including a mixture of homogeneous diols including two kinds of homogeneous diols which have an average molecular weight difference therebetween of 800 to 3600 at not less than 50% by mass in total with respect to polyol ingredient, isocyanate, water, catalyst and foaming agent, being foamed and being left to stand.

As used herein, "homogeneous diol" generally means one diol or two or more kinds of diols having an average molecular weight difference therebetween of 400 or less. Also, an "average molecular weight difference" means a difference between the respective average molecular weights of object diols. If there is a lot of combinations of the difference, an "average molecular weight difference" particularly means the largest difference.

As the polyol ingredient used for manufacturing the prepolymer, for example, polyether polyols made by addition polymerization of ethylene oxide and propylene oxide, polytetramethylene ether glycol, polyesther polyol made by condensing an acid ingredient and a glycol ingredient, polyester polyol made by ring-open polymerization of caprolactone, polycarbonate diols or the like can be used.

In the present invention, examples of a polyether polyol used for manufacturing the substrate polyurethane foam include (1) a polyether polyol of such a type that, for example, propylene oxide alone is added to diethylene glycol, (2) a polyether polyol of such a type that, for example, propylene oxide and ethylene oxide are added in block or randomly to diethylene glycol, and (3) a polyether polyol of such a type that, for example, acrylonitrile or styrene is grafted to the above (1) or (2), but not restricted thereto, and in order to achieve more effect, the polyether polyol of type (1) is preferred.

Examples of initiator used for manufacturing the polyether polyol include polyalcohols, polyphenols, mono- or polyamine, and others. Polyalcohols and polyphenols are preferred, and polyalcohols are more preferred. Examples thereof include ethylene glycol, diethylene glycol, triethylene glycol, propylene glycol, 1,3-butanediol, 1,4-butanediol. Among these, diethylene glycol is particularly preferred.

Examples of the polyether polyol ingredients may include polyol ingredients other than diols. Examples of such polyol ingredients include a trifunctional polyol usually used for manufacturing substrate polyurethane foam such as a polyol in which an alkylene oxide such as a propylene oxide is added to glycerin base, or a polyol made by adding two kinds of alkylene oxides such as propylene oxide and ethylene oxide randomly or in block. Examples of a polyfunctional polyol include a polyether polyol in which the same substances as above are added to saccharose base.

As the polyether polyol which is made by addition polymerization of ethylene oxide and propylene oxide, a polyether polyol which is made by addition polymerization of ethylene oxide and propylene oxide by using as a starting material, for example, water, propylene glycol, ethylene glycol, glycerin, trimethylolpropane, hexane triol, triethanol amine, diglycerine, pentaerythritol, ethylene diamine, methyl glucoside, aromatic diamine, sorbitol, sucrose or phosphoric acid is exemplified, and a polyether polyol which is made by using as a starting material water, propylene glycol, ethylene glycol, glycerin, trimethylolpropane or hexane triol is particularly preferred. With respect to the percentage of ethylene oxide and propylene oxide to be added and the microstructures of the polyether polyol, the percentage of ethylene oxide is preferably 2 to 95% by mass, and more preferably 5 to 90% by mass; and a polyether polyol which has etheylene oxide at a terminal thereof is preferred. The sequence of ethylene oxide and propylene oxide in the molecular chain is preferably random.

With respect to the molecular weight of the polyether polyol, when water, propylene glycol or ethylene glycol is used as a starting material, the polyether polyol is bifunctional, and the molecular weight is preferably in the range of 300 to 6000 in terms of weight-average molecular weight, and more preferably in the range of 3000 to 5000. When glycerin, trimethylolpropane or hexane triol is used as a starting material, the polyether polyol is trifunctional, and the molecular weight is preferably in the range of 900 to 9000 in terms of weight-average molecular weight, and more preferably in the range of 4000 to 8000. Further, bifunctional polyol and trifunctional polyol may be used by blending them appropriately.

The polytetramethylene ether glycol may be obtained, for example, by cationic polymerization of tetrahydrofuran. A polytetramethylene ether glycol having a weight-average molecular weight in the range of 400 to 4000, and particularly in the range of 650 to 3000 is preferably employed. Polytetramethylene ether glycols having different molecular weights are preferably blended. Further, a polytetramethylene ether glycol obtained by copolymerization of alkylene oxide(s) such as ethylene oxide and/or propylene-oxide may also be employed.

Further, the polytetramethylene ether glycol and the polyether polyol made by addition polymerization of ethylene oxide and propylene oxide are preferably blended to be used. In this case, the blend ratio thereof is suitably in the range of 95:5 to 20:80 in terms of mass ratio, and particularly, in the range of 90:10 to 50:50.

The above-mentioned polyol ingredient may be used in combination with polyols such as a polymer polyol which is an acrilonitrile modified polyol, a polyol to which melamine is added, diols such as butanediol, trimethylol propane or derivatives thereof.

As the polyisocyanate ingredient used in the present invention, aromatic isocyanate or derivatives thereof, aliphatic isocyanate or derivatives thereof, or cycloaliphatic isocyanate or derivatives thereof is used. Among these, aromatic isocyanate or derivatives thereof is preferred, and particularly, tolylene diisocyanate (TDI) or derivatives thereof, diphenylmethane diisocyanate (MDI) or derivatives, thereof, polymethylene polyphenyl isocyanate or derivatives thereof is preferably used, and used alone or used by mixing.

As the tolylene diisocyanate or derivatives thereof, crude tolylene diisocyanate, 2,4-tolylene diisocyanate, 2,6-tolylene diisocyanate, a mixture of 2,4-tolylene diisocyanate and 2,6-tolylene diisocyanate, urea modified product thereof, biuret modified product thereof, carbodiimide modified product thereof or urethane modified product modified by, for example, polyol is used. As the diphenylmethane diisocyanate or derivatives thereof, for example, a diphenylmethane diisocyanate or derivatives thereof obtained by phosgenating diamino diphenyl methane or derivatives thereof is used. Examples of the derivatives of diamino diphenyl methane include a polynuclear one, and pure diphenyl methane diisocyanate obtained by diamino diphenyl methane, polymeric diphenylmethane diisocyanate obtained by polynuclear diaminodiphenylmethane, or the like may be used. With respect to the number of functionalities of polymeric diphenylmethane diisocyanate, a mixture of pure diphenylmethane diisocyanate and polymeric diphenylmethane diisocyanates having a variety of numbers of functionalities is usually used, and those having an average number of functionalities of preferably 2.05 to 4.00, and more preferably 2.50 to 3.50 are used. Derivatives obtained by modifying these diphenylmethane diisocyanates or derivatives thereof such as urethane modified product modified by, for example, polyol, a dimer made by uretdione formation, isocyanurate modified product, carbodiimide/uretonimine modified product, allophanate modified product, urea modified product, biuret modified product may also be used. Also, several kinds of diphenylmethane diisocyanates or derivatives thereof may be blended to be used.

In the present invention, as a prepolymerization method, a method in which polyol and isocyanate are put into an appropriate container, stirred sufficiently and kept warm at a temperature of 30 to 90° C., more preferably, 40 to 70° C., for 6 to 240 hours, more preferably for 24 to 72 hours is exemplified. In this case, the quantity percentages of polyol and isocyanate are preferably adjusted such that the content of isocyanate of the obtained prepolymer is 4 to 30% by mass, and more preferably 6 to 15% by mass. If the content of isocyanate is smaller than 4% by mass, stability of the prepolymer is impaired, the prepolymer hardens during storage, and therefore, it may become unusable. If the content of isocyanate is larger than 30% by mass, the content of isocyanate which is not prepolymerized increases, and this polyisocyanate is hardened with polyol ingredient which is used in the subsequent polyurethane hardening reaction by a similar reaction mechanism to a one-shot manufacturing method which does not undergo a prepolymerization reaction, and thereby deteriorating the effect of using the prepolymer method.

To the substrate polyurethane foam, in addition to the above-mentioned polyol ingredient and isocyanate ingredient, an electrically conductive material such as carbon black, a crosslinking agent, a surfactant, a catalyst, a foam stabilizer or the like may be added, if desired, and whereby a layer structure as desired can be attained. Fire retardants, fillers, antioxidants, ultraviolet absorber or the like can also be suitably used.

Examples of ion conductive materials include ammonium salts such as perchlorate, chlorate, hydrochloride, bromate, iodate, fluoroboric acid salt, sulphate, alkyl sulfate, carboxylate, sulfonate or the like of tetraethylammonium, tetrabutylammonium, dodecyltrimethylammonium (e.g., lauryltrimethylammonium), hexadecyltrimethylammonium, octadecyltrimethylammonium (e.g., stearyltrimethylammonium), benzyltrimethylammonium, degenerated fatty acid dimethylethylammonium or the like, perchlorate, chlorate, hydrochloride, bromate, iodate, fluoroboric acid salt, trifluoro methylsulfuric acid salt, sulfonate or the like of alkali metal and alkaline earth metal such as lithium, sodium, potassium, calcium, magnesium or the like.

Examples of carbon conductive materials include gas blacks such as denka black, ketjchen black, acetylene black, oil furnace black, thermal black, channel black, lamp black including ink black. The substrate polyurethane foam according to the present invention is preferably those which is impregnated with such a carbon conductive material or those in which carbon conductive material is added.

Further, examples of electronically conductive materials include electrically conductive metal oxides such as tin oxide, titanium oxide and zinc oxide; and metals such as nickel, copper, silver and germanium. These electrically conductive materials may be used alone or may be used by mixing two or more thereof. The amount to be added is not restricted, and can be selected appropriately as desired. The amount to be added is usually 0.1 to 40 parts by mass, preferably 0.3 to 20 parts by mass with respect to 100 parts by mass of the total amount of polyol and isocyanate.

It is preferred to add, in the substrate polyurethane foam, a silicone foam stabilizer or a variety of surfactants in order to stabilize cells of foam material. As the silicone foam stabilizer, dimethylpolysiloxane-polyoxyalkylene copolymer or the like is suitably employed, and those which have dimethylpolysiloxane portion having a molecular weight of 350 to 15000 and polyoxyalkylene portion having a molecular weight of 200 to 4000 are particularly preferred. The molecular structure of polyoxyalkylene portion is preferably an addition polymer of ethyleneoxide or an addition polymer of both ethyleneoxide and propylene oxide, and also, the ends of the molecular are preferably ethyleneoxide. Examples of the surfactants include ionic surfactants such as cationic surfactant, anionic surfactant and ampholytic surfactant, and nonionic surfactants such as a variety of polyethers and a variety of polyesters. These may be used alone or two or more thereof may be used in combination. The amounts of silicone foam stabilizer and a variety of surfactants to be added are preferably 0.1 to 10 parts by mass, and more preferably 0.5 to 5 parts by mass with respect to 100 parts by mass of the total amount of polyol ingredient and isocyanate ingredient.

In the present invention, the kind and the amount of the compound used as a foaming agent are not particularly restricted, and known compounds may be employed. As the foaming agent, for example, methylene chloride, Freon 123 and Freon 141b are employed.

Examples of the catalyst which is used for the hardening reaction of the substrate polyurethane foam include monoamines such as triethylamine, dimethylcyclohexylamine; diamines such as tetramethylethylenediamine, tetramethylpropanediamine, tetramethylhexanediamine; triamines such as pentamethyldiethylenetriamine, pentamethyldipropylenetriamine, tetramethylguanidine; cyclic amines such as triethylenediamine, dimethylpiperazine, methylethylpiperazine, methylmorpholine, dimethylaminoethylmorpholine, dimethylimidazole; alcohol amines such as dimethylaminoethanol, dimethylaminoethoxyethanol, trimethylaminoethylethanolamine, methylhydroxyethylpiperazine, hydroxyethylmorpholine; etheramines such as bis(dimethylaminoethyl) ether, ethylene glycol bis(dimethyl)aminopropyl ether; organometallic compound such as stannous octate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenyl mercuric propionate, lead octenoate. These catalysts may be used alone, or two or more of these may be used in combination.

In the present invention, the air permeability of the charge-controlled polyurethane foam is preferably 100 to 700 cm³/cm²/sec, and in particular, the air permeability of the charge-controlled polyurethane foam is more preferably about 150 to 400 cm³/cm²/sec. If the air permeability is larger than 700 cm³/cm²/sec, a toner-efficiency may decrease due to an excessive toner density. On the other hand, if the air permeability is smaller than 100 cm³/cm²/sec, the substrate polyurethane foam is less likely to be impregnated with an impregnating solution during the impregnation process, and therefore, the amounts of a charge control agent and binder to be attached may be less likely to be constant. This may lead to a decrease in productivity. Note that the above-mentioned air permeability was measured in accordance with JIS K 6400 standard.

In the present invention, the number of cells in the charge-controlled polyurethane foam is preferably 20 to 80/inch (25.4 mm), and more preferably 30 to 60/inch. If the number of cells in the charge-controlled polyurethane foam is smaller than 20/inch, a space to which toner attaches decreases, and thus the development is likely to be affected. On the other hand, if the number of cells in the charge-controlled polyurethane foam is larger than 80/inch, the substrate polyurethane foam is less likely to be impregnated with an impregnating solution during the impregnation process, and therefore, the amounts of the charge control agent and binder to be attached may be less likely to be constant. Moreover, impregnation speed may become slow and the cost may rise.

Further, the average cell diameter of the charge-controlled polyurethane foam is preferably 50 to 1000 μm, and more preferably about 100 to 400 μm. If the average cell diameter is larger than 1000 μm, a toner-efficiency may decrease due to an excessive toner density. On the other hand, if the average cell diameter is smaller than 50 μm, the substrate polyurethane foam is less likely to be impregnated with an impregnating solution during the impregnation process, and therefore, the amounts of the charge control agent and binder to be attached may be less likely to be constant.

In the present invention, the density of the charge-controlled polyurethane foam is preferably 10 to 100 kg/m³, and more preferably about 10 to 50 kg/m³. If the density is larger than 100 kg/m³, the cost may rise. On the other hand, if the density is smaller than 10 kg/m³, a compression residual strain is likely to be degraded, and a following response withers, which may cause blur.

The hardness of the charge-controlled polyurethane foam is preferably an ASKER F hardness of 30 to 90°. If the hardness is larger than 90°, toner may deteriorate, and if the hardness is smaller than 30°, a poor polishing is likely to be caused, which is not desirable.

An axis 1 used for a roller of the present invention is not restricted, and any material can be used. For example, steels such as sulfur free-cutting steel plated with nickel, zinc or the like, a cored bar composed of a metal solid body made of iron, stainless steel, aluminum, or the like, or a metal shaft such as a hollow metal cylindrical body can be employed. In the present invention, it is preferred that the diameter of the axis 1 is smaller than 6 mm, for example, 5.0 mm, and the thickness of charge-controlled polyurethane foam 3 is smaller than 4.5 mm, for example, 4.0 mm. This can make the roller light, and at the same time, the thinned charge-controlled polyurethane foam 3 increases the macroscopic elastic modulus of the polyurethane foam to improve the toner sweeping ability. The volume decrease due to the thinned charge-controlled polyurethane foam 3 reduces the toner amount which the charge-controlled polyurethane foam 3 contains during an endurance printing, and thus the toner-efficiency can be controlled.

Further, in the roller of the present invention, as illustrated, it is preferred that an adhesion layer 2 be provided between the axis 1 and the charge-controlled polyurethane foam 3. As an adhesive used for the adhesive layer 2, a hot-melt polymer adhesive which has, as a main ingredient, an adipate-based polyurethane resin having a melting point of 120° C. or higher, and particularly 130° C. or higher and 200° C. or lower can be suitably employed.

As the characteristics of the adhesive, any forms such as films and pellets may be employed. The thickness of the adhesion layer 2 is preferably 20 to 300 μm. In a case when the thickness is too small, a poor adhesion occurs, and in a case when the thickness is too large, a preferable roller resistance cannot be obtained. Neither of the cases is preferred. It is preferred that the melting temperature of the adhesive at the time of adhesion be 100° C. or higher, and particularly 130° C. or higher and 200° C. or lower, and be a temperature lower than the melting point of the adhesive. By this, the adhesion layer 2 becomes in a semi-molten state, and thus it becomes easy to control voltage-dependencies such as to set a roller resistance from $10^6$ to $10^8 \Omega$ when a voltage of 5 V is applied and to set a roller resistance from $10^2$ to $10^4 \Omega$ when a voltage of 100 V is applied, which can increase the initial density of an endurance printing.

A toner-conveying roller of the present invention can be manufactured by supporting the periphery of the axis 1 with the charge-controlled polyurethane foam 3 via an adhesive as required, and then heat-binding the axis 1 and the charge-controlled polyurethane foam 3 at a prescribed temperature.

In concrete, the charge-controlled polyurethane foam 3 is molded in any shapes such as in a slab form. In the present invention, in the course of molding the charge-controlled polyurethane foam 3, a method can preferably be employed in which, by using a low-pressure foaming machine, a prepolymer and a mixture of the other ingredients are mixed by a mixing rotor at a mechanical head portion, and the resulting mixture is poured into a mold having a temperature of 40 to 80° C. to be hardened by heating. The charge-controlled polyurethane foam 3 which can be molded by this method is a foam which has a lower hardness than those obtained by mechanical gas filling such as an ASKER F hardness of 30 to 90°.

A film of adhesive is formed on the periphery of the axis 1 by winding a film adhesive thereon, or by melting pellet adhesive to be applied thereto. Then, a hole is formed on the charge-controlled polyurethane foam 3, and the axis 1 with adhesive is inserted into the hole. Then, the resultant is heated at a prescribed temperature to integrate the axis 1 and the charge-controlled polyurethane foam 3 via the adhesion layer 2. The surface of the charge-controlled polyurethane foam 3 is ground into a desired cylindrical shape, and further, the ends of the charge-controlled polyurethane foam 3 are cut to make a prescribed shape, whereby a toner-conveying roller of the present invention can be obtained.

EXAMPLES

The present invention will be described more concretely by way of Examples and Comparative Examples. However, the present invention is not limited thereto without departing from the scope of the invention.

<Materials>

In the following, materials used in Examples and the Comparative Example are shown.

| | |
|---|---|
| polyurethane foam A | manufactured by BRIDGESTONE CORPORATION (without membrane exclusion treatment) density 29 kg/m³ air permeability 196 cm³/cm²/sec hardness 10 kgf average cell diameter 280 μm |
| binder a | "SE BINDER" urethane resin dispersant in water, solid content 50%; manufactured by ENEX CO., LTD. |
| binder b | "TOCRYL BC-X6131" urethane resin dispersant in water, solid content 50%; manufactured by TOYO INK MFG. CO., LTD. |
| charge control agent | copolymer of acrylate monomer "BS-050301-1" manufactured by ENEX CO., LTD. |
| antifoaming agent | "KS-502" manufactured by Shin-Etsu Chemical Co., Ltd. |

Example 1

In accordance with a recipe (unit: g) shown in Table 1, the above-listed binder a, charge control agent, antifoaming agent were mixed to prepare an impregnating solution. In a bath filled with the impregnating solution, a block (16 mm×1000 mm×2000 mm) polyurethane foam A without membrane exclusion treatment was immersed and compressed between two rolls, and then released to be impregnated with the impregnating solution. The polyurethane foam A was introduced out of the bath and the residual impregnating solution was squeezed to be removed therefrom via nip rolls, then the polyurethane foam A was dried by heating in a hot blast stove at a temperature of 110° C. for 10 minutes, whereby charge-controlled polyurethane foam was obtained. The amount of the impregnating solution attached to the charge-controlled polyurethane foam was 8 g/L in terms of dry mass.

The amount of impregnating solution attached can be adjusted by adjusting the pressure of the compression after taking the block polyurethane foam out of the impregnating solution or by changing the concentrations of the charge control agent and binder in the impregnating solution.

A hole for insertion of a shaft was punched out on the thus obtained charge-controlled block polyurethane foam impregnated with the charge control agent and binder, and a shaft (diameter: 6.0 mm, length: 250 mm) to which an adhesive was applied was inserted into the hole. Then, the block polyurethane foam was ground into an elastomeric foam having a uniform thickness, whereby a toner-conveying roller of the present invention was made.

Example 2

As a binder for an impregnating solution, binder b was used; the interval of nip rolls was adjusted; and the amount of the impregnating solution attached (dry mass) was set at 11 g/L. Toner-conveying roller was made in the same manner as in Example 1 except for the above.

Comparative Example 1

As a binder for an impregnating solution, binder a was used; the interval of nip rolls was adjusted; and the amount of the impregnating solution attached (dry mass) was set at 3.5 g/L. Toner-conveying roller was made in the same manner as in Example 1 except for the above.

<Evaluation>

The physical properties of the toner-conveying rollers obtained in Examples 1 and 2 and Comparative Example 1 were evaluated as described below. The results are also shown in Table 1.

(1) Average Cell Diameter (μm)

The surface of the polyurethane foam was imaged by a microscope, cell diameters on the surface of the polyurethane foam were measured to determine the average of the cell diameters.

(2) Asker F Hardness (°)

Polyurethane foam was placed on a rigid plate and measured using an Asker Durometer type F manufactured by KOBUNSHI KEIKI CO., LTD. The hardness 10 seconds after the time when the durometer was placed still was measured.

(3) Air Permeability ($cm^3/cm^2/sec$)

The air permeability was measured in accordance with JIS K 6400.

(4) The Number of Cells (/inch)

The number of the cells was measured in accordance with JIS K 6400.

(5) Skeletal Shape

The surface of the polyurethane foam was photographed at a magnification of 100, and judged whether the skeletal shape had an edge or not (the urethane skeleton which did not have a radius corner was defined as "having an edge").

(6) Evaluation of Image

The toner-conveying rollers obtained in Examples 1 and 2, and the Comparative Example 1 were set in commercially available printers, and printing processes were conducted under the below-mentioned conditions to evaluate the printing performances.

20000 sheets of A4-size papers are printed in a 4% printing pattern. In the course that 20000 sheets of A4-size papers are printed, 3 consecutive sheets are printed in a black 100% pattern for every 1000 sheets. 3 consecutive sheets are printed in a black 100% pattern for 20 times in total. For each 100% pattern printing, an evaluation was conducted in three grades as described below. The average grade for 20 evaluations is calculated (image average evaluation). As the toner, negatively charged toner was used.

(Evaluation Criteria)

A case when blur is occurred on the first or second sheet of the three sheets represents x.

A case when blur is occurred on the third sheet of the three sheets represents Δ.

A case when no blur is occurred on the three sheets represents ◯.

After printing 20000 sheets of A4-size, 3 consecutive sheets were printed in a black 100% pattern. An evaluation was conducted in three grades as described below to evaluate an image durability (image durability evaluation).

(Evaluation Criteria)

A case when blur is occurred on the first or second sheet of the three sheets represents x.

A case when blur is occurred on the third sheet of the three sheets represents Δ.

A case when no blur is occurred on the three sheets represents ◯.

TABLE 1

|  |  | Example 1 | Example 2 | Comparative Example 1 |
|---|---|---|---|---|
| Amount of impregnating solution | Binder a | 100 | — | 100 |
|  | Binder b | — | 100 | — |
|  | Charge control agent | 300 | 300 | — |
|  | Antifoaming agent | 0.3 | 0.3 | 0.3 |
| Amount of impregnating solution attached (dry mass, % by mass) |  | 8 | 11 | 3.5 |
| Membrane exclusion treatment of polyurethane foam |  | Not applied | Not applied | Not applied |
| Evaluation | Average cell diameter (μm) | 300 | 310 | 305 |
|  | Asker F hardness (°) after immersion* | 69 | 85 | 60 |
|  | Air permeability after immersion (cm³/cm²/sec) | 200 | 210 | 195 |
|  | Number of cells (/inch) | 38 | 38 | 38 |
|  | Skeletal shape (with or without edge) | with edge | with edge | with edge |
|  | Image average evaluation | ○ | ○ | X |
|  | Image endurance evaluation | ○ | ○ | X |

*The thickness was set to 10 mm.

DESCRIPTION OF SYMBOLS

1 axis
2 adhesion layer
3 charge-controlled polyurethane foam
11 image forming body
12 developing roller
13 toner-conveying roller
14 toner storage unit
15 transfer roller
16 charge unit
17 exposure unit
18 blade
20 toner

The invention claimed is:

1. A toner-conveying roller which comprises a charge-controlled polyurethane foam, wherein a surface layer of the polyurethane foam is impregnated with a binder and a charge control agent which is on the negative side or on the positive side in the triboelectric series with respect to the charge-controlled polyurethane foam,
   wherein the charge-controlled polyurethane foam is on an outer surface of an axis member of the roller,
   wherein the density of the charge-controlled polyurethane foam is 10 to 50 kg/m³, and
   wherein a number of cells in the charge-controlled polyurethane foam is from 20 to 80 cells/inch.

2. The toner-conveying roller according to claim 1, wherein said charge control agent is on the negative side in the triboelectric series with respect to said polyurethane foam, and wherein the roller is for a positively charged toner.

3. The toner-conveying roller according to claim 1, wherein said charge control agent is on the positive side in the triboelectric series with respect to said polyurethane foam, and wherein the roller is for a negatively charged toner.

4. The toner-conveying roller according to claim 1, wherein the charge-controlled polyurethane foam is directly on the outer surface of the axis member.

5. The toner-conveying roller according to claim 1, wherein the charge-controlled polyurethane foam is adhered to the outer surface of the axis member by an adhesive layer.

6. The toner-conveying roller according to claim 1, wherein the axis member is cored bar composed of a solid metal body.

7. The toner-conveying roller according to claim 1, wherein the axis member is metal shaft which is a hollow metal cylindrical body.

* * * * *